United States Patent
Igumnov et al.

(10) Patent No.: US 7,022,160 B2
(45) Date of Patent: Apr. 4, 2006

(54) METHOD OF PURIFYING GASEOUS NITROGEN TRIFLUORIDE

(75) Inventors: Sergei Mikhailovich Igumnov, Moscow (RU); Valery Pavlovich Kharitonov, deceased, late of Moscow (RU); by Nina Valerievna Kharitonova, legal representative, Perm (RU); by Natalya Vasilievna Kharitonova, legal representative, Perm (RU)

(73) Assignee: Zakrytoe Aktsionernoe Obschestvo Nauchno-Proizvodstvennoe Obiedinenie "Pim-Invest", Moscow (RU)

(*) Notice: Subject to any disclaimer, the term of this patent is extended or adjusted under 35 U.S.C. 154(b) by 72 days.

(21) Appl. No.: 10/370,062

(22) Filed: Feb. 21, 2003

(65) Prior Publication Data

US 2003/0221556 A1 Dec. 4, 2003

(30) Foreign Application Priority Data

Feb. 26, 2002 (RU) .............................. 2002105042

(51) Int. Cl.
*B01D 53/02* (2006.01)
*B01D 53/68* (2006.01)
*C01B 21/083* (2006.01)

(52) U.S. Cl. ........................... 95/131; 95/142; 423/406
(58) Field of Classification Search ................ 423/406; 95/131, 141, 142
See application file for complete search history.

(56) References Cited

U.S. PATENT DOCUMENTS

| | | | |
|---|---|---|---|
| 3,125,425 A | | 3/1964 | Richmond |
| 4,663,052 A | * | 5/1987 | Sherman et al. ............ 210/679 |
| 4,830,734 A | * | 5/1989 | Nagji et al. .............. 208/208 R |
| 4,933,158 A | * | 6/1990 | Aritsuka et al. ............. 423/210 |
| 5,032,152 A | * | 7/1991 | Vansant et al. ................. 95/95 |
| 5,069,690 A | * | 12/1991 | Henderson et al. ............ 95/88 |
| 5,069,887 A | * | 12/1991 | Suenaga et al. .............. 95/128 |
| 5,106,396 A | * | 4/1992 | Mitariten ........................ 95/99 |
| 6,068,681 A | * | 5/2000 | Bourguignon ............... 95/116 |

FOREIGN PATENT DOCUMENTS

JP   10-259011   9/1998

OTHER PUBLICATIONS

Massonne, Joachim, "Die gas-chromatographische Trennung des Stickstofftrifluorides vom Kohlenstofftetrafluorid an 'Porapak Q'". Z. Analyt. Chem. 1968, 235: 341-344 (in German), no month.

Herkelmann, Ralf, "Handling and Security in the Synthesis and Purification of Nitrogen Trifluoride". J. Fluor. Chem., Sep./Oct. 1991, 54: 37.

Gmelin Handbook, F Suppl., vol. 4, Section 4.1.4.1.5, "Purification", 1986, pp. 179-180, no month.

* cited by examiner

*Primary Examiner*—Wayne A. Langel
(74) *Attorney, Agent, or Firm*—Nath & Associates PLLC; Gary M. Nath; Jerald L. Meyer

(57) ABSTRACT

The present invention relates to a method of purifying gaseous nitrogen trifluoride from $CF_4$ as impurity.

The method comprises selective adsorption of nitrogen trifluoride by dehydrated erionite at a temperature of from −30 to 30° C., displacement of carbon tetrafluoride by an inert gas, desorption and condensation of the purified nitrogen trifluoride. The purification yields 99.99% pure $NF_3$ with $CF_4$ content not over 10 ppm.

The proposed method of $NF_3$ sorption purification makes it possible to carry out the process at an ambient temperature and with long operating life of the sorbent. The method is practically feasible, economically expedient, and easy to implement under industrial conditions.

4 Claims, No Drawings

METHOD OF PURIFYING GASEOUS NITROGEN TRIFLUORIDE

FIELD OF THE ART

The present invention relates to the field of inorganic chemistry, particularly to a method of purifying gaseous nitrogen trifluoride from carbon tetrafluoride.

STATE OF THE ART

Nitrogen trifluoride is widely used in the manufacture of semiconductor materials, high-energy lasers and in chemical gas phase precipitation processes. Unlike elementary fluorine, nitrogen trifluoride can be easily transported in condensed form with packing density of up to 600 g/l, using containers for storing compressed gases with a pressure of up to 110 atm (J. Fluor. Chem., 1991, 56, No. 1–3, p. 37).

Present-day electronic industry sets very high requirements to the purity of nitrogen trifluoride used in technologies of high-purity semiconductor materials. With the content of the main substance 99.9–99.999% $NF_3$, the total content of impurities should not exceed 10–1000 ppm or volume parts per million parts of the main product. The most difficult technological task is purifying nitrogen trifluoride from carbon tetrafluoride as impurity, whose content even in a small amount involves a problem in the process of etching semiconductors due to formation of solid residues of carbon or silicon carbide. The complexity of separating $NF_3$ and $CF_4$ stems from insignificant difference in the size of their molecules and in the boiling point, the latter not exceeding 1° C. (Gmelin Handbook, 1986, v. 4, pp. 179–180).

Known in the art is a process of separating gaseous fluorides by gas chromatography techniques, using as the separation phase a silica gel having an average pore diameter of 22 Å mixed with a liquid low-molecular chlorotrifluoroetylene polymer in an amount of 5–30 wt. % (U.S. Pat. No. 3,125,425, Mar. 17, 1964). The polymer is liquid at 0° C., has a molecular weight of 200 to 1500 and a boiling point of 121–260° C. at 0.5 mm of Hg pressure. The process of gas chromatography separation enables obtaining fluorides with a concentration higher than 90% of the main substance from gas mixtures containing $NF_3$ and $CF_4$, at temperatures of −80 to 50° C. This process suffers from such disadvantages as low efficiency, high consumption of helium or other inert gas (to 500 liters per liter of $NF_3$), and also insufficiently high effectiveness of the separation when the concentration of impurities is smaller than 1 vol. %. The purity of the nitrogen trifluoride obtained by the known process does not exceed 99 vol. %., this being obviously insufficient for using the product in the electronic industry.

For obtaining gaseous halides with electronic industry level purity, there was proposed a gas chromatography method, in which a porous polymer is used, in particular "Poropak", as the separating (adsorption) medium (Z. Analyt. Chem., 1968, 235, No. 4, pp. 341–344). This method has found wide application in the gas chromatography of mixtures of nitrogen trifluoride with $CF_4$, $N_2F_2$, $CO_2$, $N_2O$ and some other impurities, but its application for providing an industrial gas purification process holds no promise in view of an insignificant difference in the yield time of $CF_4$ and $NF_3$ and large consumption of the separating inert gas.

For overcoming the above-indicated disadvantages, there was proposed a method of isolating $NF_3$ from a mixture of $NF_3$ and $CF_4$, using gas-solid chromatography techniques and yielding components with purity as high as 99.99% (U.S. Pat. No. 5,069,690, Dec. 3, 1991). This invention is an improved method of preparative gas chromatography for separating $CF_4$ from $NF_3$, using hydrothermally treated zeolite molecular sieve 5A as the chromatographic adsorbent, or chabazite. The method consists in passing discrete pulses of a mixture of $NF_3$ and $CF_4$ in a continuous flow of an inert carrier gas through a bed of porous adsorbent that kinetically adsorbs $NF_3$ more readily than $CF_4$. As such adsorbent use is made of hydrothermally pretreated 5A molecular sieve or chabazite having an effective pore window ranging from 4.4 to 4.8 Å. It should be noted, however, that under static conditions, as is seen from FIGS. 4, 5, 6 presented in said Patent, the employed sorbents adsorb $NF_3$ and $CF_4$ in an absolutely similar manner. The mass velocity of gas is from 2.5 to 8.6 g/cm²·hr. Large consumption of the separating carrier gas (at least 100 liters per liter of the obtained $NF_3$) enables the authors to recommend the use hydrogen, along with helium, nitrogen and argon, this being permissible from the standpoint of the explosion safety of the process, only when the $NF_3$ concentration in mixtures with $H_2$ is at least 9.0 vol. %.

The main disadvantages of this $NF_3$ isolation method are: low efficiency, large consumption of the carrier gas, necessity in special energy-demanding hydrothermal pretreatment of the zeolite (untreated zeolite does not allow separating the mixture of $NF_3$ and $CF_4$ and providing the required quality of the product), as well as necessity in very precise regulation of the flow discharge of all the gas flows, so as to preclude secondary contamination of nitrogen trifluoride at the outlet of the separation plant.

All this complicates the process and makes it economically disadvantageous for industrial implementation.

Known in the art is a method of removing water and nitrous oxide from a mixture containing nitrogen trifluoride, water, nitrous oxide, carbon dioxide, difluorodiazine; the mixture may further contain oxygen, carbon tetrafluoride and sulfur hexafluoride or their mixtures (JP 10-259011, Sep. 29, 1998.

In said Japanese Patent there is set and solved a problem of purifying nitrogen trifluoride from water and nitrous oxide and to rule out the interaction of $NF_3$ with the adsorbent (zeolite), which results in secondary contamination of $NF_3$ with nitrous oxide.

For accomplishing this object, the authors of said JP Patent have developed a two-step method, wherein, first, water is removed on a zeolite with a pore size of at least 3 Å by contact with the zeolite having a Si/Al ratio greater than 3.0 (preferably 4.5), selecting zeolite from the group of clinoptilolite, mordenite, offretite, erionite, ZSM-5, ferrierite, L, omega, beta or their mixture.

The authors of said Patent observe that none of the zeolites adsorbs $NF_3$.

According to the Examples presented in the specification, for the purification of nitrogen trifluoride from $N_2O$ impurity, sodium mordenite is used (Example 2). In other Examples 1, 3–6) a possibility is shown to rule out secondary contamination of $NF_3$ with nitrous oxide due to the interaction of $NF_3$ with the zeolite.

As it follows from the specification, said method does not solve the problem of separating the mixture of $NF_3$ and $CF_4$, though the authors speak about possible presence of $CF_4$ in the mixture, separation of the $NF_3$ and $CF_4$ mixture is shown neither in the Examples nor in the text.

Closest in its technical essence and the attained result to the method proposed in our invention is the method of purifying gaseous nitrogen trifluoride containing $CF_4$ as impurity, comprising the step of contacting gaseous nitrogen trifluoride with a crystalline porous synthetic zeolite which is substantially uniform in the pore size and has an effective pore size of about 4.9 Å at a temperature of from −50 to 10° C., subsequent displacement of the gases, containing $CF_4$, from the adsorbent, desorption of the purified nitrogen trifluoride, and condensation (U.S. Pat. No. 5,069,887, Dec. 3, 1991, prototype). As the synthetic zeolite molecular sieve 5A is used, represented by the empirical formula $Ca_6Al_{12}Si_{12}O_{48}XH_2O$, containing 1–10 wt. % of crystallization water. With the content of crystallization water in the zeolite 5A less than 1 wt. %, the adsorbent effectively adsorbs both $CF_4$ and $NF_3$ without noticeable selectivity. With the content of water greater than 10%, the sorption of $NF_3$ and $CF_4$ occurs in almost equal and very small amounts. Adsorption temperature is an essential factor, since above 10° C. the degree of $NF_3$ adsorption lowers markedly. For displacing $CF_4$ from the molecular sieve an inert gas (helium) is used. Desorption of nitrogen trifluoride is carried out under vacuum. Nitrogen trifluoride obtained by this method contains less than 10 ppm $CF_4$, this corresponding to the requirements of the electronic industry.

As the authors of said Patent indicate, using molecular sieves or zeolites of other class, it is difficult to effect selective adsorption of $NF_3$ alone. Only with the use of molecular sieve 5A with the pore size of about 4.9 Å, on condition that the water content ranges within 1 to 10 wt. % and the zeolite is maintained at a temperature not higher than 10° C., selective adsorption of $NF_3$ is attainable.

The above method suffers from such disadvantages as a considerable lowering of the adsorbent capacity from 4.5 to 1 wt. % $NF_3$ even within the indicated range of crystallization water content in the molecular sieve 5A, and an insignificant operating life of the zeolite. Maintaining a temperature of −50 to 10° C. in the adsorption zone is called for not so much by the factor of lowering the capacity of the molecular sieve 5A, though this factor is very significant, as, in the opinion of the authors of the present invention, by the necessity of minimizing the course of the reaction of hydrolysis of nitrogen trifluoride in the process of desorption and, correspondingly, of minimizing the fluorination of the molecular sieve with the products of hydrolysis, which occurs in the sorbent regeneration above 60° C. Probably, in the case of separating pure two-component mixtures of $NF_3$ and $CF_4$ on molecular sieve 5A at temperatures of −50 to 10° C., the period of cyclic operation of the zeolite would have been sufficiently long. However, the presence of even a relatively small amount (from 10 to 100 ppm) of such impurities as $CO_2$, $N_2O$, $N_2F_2$ and $H_2O$, adsorbed as well as $NF_3$ by the molecular sieve 5A, leads to substantial lowering of the zeolite capacity for $NF_3$ and to the necessity of regenerating the adsorbent.

In this case the recommended adsorbent—molecular sieve 5A with water content of 1–10 wt. %—comprises a contradiction: on the one hand, this is the necessity of presence of crystallization water for providing selective separation of the mixture of $NF_3$ and $CF_4$; on the other hand, this is the necessity of maximum prevention of the course of the reaction of $NF_3$ hydrolysis and zeolite fluorination. All this is indicative of the process instability and of its being difficult to reproduce under industrial conditions.

It should be noted that the factor of chemical stability to fluorination and the stability of the pore (window) size of the molecular sieve involved thereby is sufficiently ponderable, taking into account a large volume of the adsorbent to be used in industrial implementation of the method and its high cost.

ESSENCE OF THE INVENTION

It is an object of the invention to provide an industrial method of sorption purification of nitrogen trifluoride from $CF_4$ as impurity, as well as to enhance the chemical stability and prolong the operating life of the sorbent.

Said object is accomplished by using as the adsorbent a molecular sieve of erionite type of the empirical formula $(Na,K)_9Al_9Si_{27}O_{72} \cdot 27H_2O$, having a minimum and maximum window (pore) diameters equal to 3.5 and 5.2 Å, predehydrated to the water content less than 1.0 wt. %.

The proposed method of purifying nitrogen trifluoride comprises the following steps:
  selective adsorption of $NF_3$ by a porous synthetic zeolite at a temperature of −30 to 30° C.;
  displacement of carbon tetrafluoride by an inert gas from the surface of the zeolite;
  desorption and condensation of the purified nitrogen trifluoride.

The selectivity of the molecular sieve effect of zeolite can, as a rule, be evaluated by comparing the molecular sizes and the pore diameter. Though it is known that there exists an interrelation between the structure of zeolites, their activity and various factors, a distinctive feature of zeolites is a regular porous crystalline structure formed by a system of cavities and channels. The adsorption cavity of erionite has the form of a cylinder with a diameter of 6.3 to 6.6 Å and the length of 15.1 Å. Sorbate molecules can penetrate into the erionite cavity through six elliptical windows formed by 8-membered oxygen rings. The minimum and maximum size of an elliptical window are 3.5 and 5.2 Å, respectively. It should be noted that, unlike elliptical windows in erionite, windows in 5A zeolite are approximately round. The porous structure of 5A zeolite is formed by a three-dimensional network of large spherical cavities, whose diameter is 11.4 Å. Molecules can penetrate into the cavity through six windows having a free diameter of 4.2 to 4.9 Å (see Jule A. Rabo (Ed.), Zeolite Chemistry and Catalysis (Russian Edition), Moscow: Mir, 1980, v.1, pp. 474–475, 480–481).

It is likely that the specific feature of the erionite molecular sieve structure is such that it makes possible to carry out the process of $NF_3$ adsorption selectively with respect to $CF_4$ under the found conditions. Mixtures with any concentration of $CF_4$ impurity can be subjected to purification, but it is especially difficult to purify a mixture of $NF_3$ and $CF_4$, in which the amount of $CF_4$ as impurity is smaller than 1.0 wt. %.

Comparing the chemical composition of the 5A molecular sieve and erionite, it should be noted that the $SiO_2/Al_2O_3$ and $SiO_2/Me_nO$ ratio for erionite is 1.5 times higher, this factor being decisive for the acid resistance of molecular sieves, and, consequently, for the operating life of the adsorbent. For separating a mixture of gaseous $NF_3$ and $CF_4$, the authors used commercial zeolite (erionite) of grade KNaE.

The content of water in erionite should not exceed 1.0 wt. %. An increase of water content in the zeolite reduces its capacity and involves a possibility of hydrolysis processes to occur. Therefore, prior to starting the sorption, the adsorbent is subjected to predehydratation with a stream of air or nitrogen heated to 300° C. Adsorption is carried out in the range of temperatures from −30 to 30° C., predominantly at the ambient temperature. Temperature lowering is economically inexpedient, while at a temperature higher than 30° C. the capacity of erionite lowers, and the efficiency of the purification process lowers accordingly.

On completion of the process of $NF_3$ sorption, gaseous nitrogen having a temperature not exceeding 20° C. is passed through the sorbent during a period of time sufficient for complete displacement of $CF_4$-containing gases, as confirmed by an analysis of relief gases.

Desorption of the purified nitrogen trifluoride from the zeolite is effected with gaseous nitrogen preheated to 20–60° C. The process of desorption is stopped when the $NF_3$ concentration in the waste gas lowers to 0.5 vol. %.

Nitrogen trifluoride formed in the desorption step, in a mixture with nitrogen comes to condensation at a temperature of minus 150–190° C.

Condensation of nitrogen trifluoride from its gaseous mixtures with nitrogen leads to partial condensation of nitrogen. The removal of nitrogen from liquid $NF_3$ is performed by known methods. As a result of purification, 99.99% pure $NF_3$ is obtained.

The composition of gaseous $NF_3$ before and after the purification is determined by chromatographic analysis. In the course of nitrogen trifluoride purification from $CF_4$ such high-boiling impurities as $CO_2$, $N_2O$, $N_2F_2$ may accumulate gradually on the zeolite, whereby the sorbent capacity may lower.

The authors of the present invention have revealed that after 50 cycles of adsorption purification the sorbent capacity lowers to 10% of the starting one. In this connection, it is recommendable to carry out periodically erionite regeneration by purging with an inert gas with a temperature of 20–100° C. In the proposed method of adsorption with a low content of water in erionite the process of hydrolysis is ruled out, therefore the desorption and zeolite regeneration are feasible at high temperatures, and this does not lead to its fluorination. Thus, the service life of the adsorbent is prolonged and the process stability is increased. For instance, after carrying out 1200 operations of adsorption purification and 40 operations of erionite regeneration, the quality of the end product did not change, and the content of nonvolatile fluorides in the zeolite did not exceed 0.01 wt. % (F). The developed method of sorption purification of $NF_3$ from $CF_4$ impurity makes it possible to carry the process at the ambient temperature and with a long operating life of the sorbent. The method is technologically effective, economically expedient and can easily be implemented under industrial conditions.

The following examples are illustrative of the present invention, though the invention is not limited to these examples.

EXAMPLE 1

Purification of nitrogen trifluoride from $CF_4$ is carried out in a steel column having a length of 3.2 m and an inner diameter of 0.15 m, filled with 25 kg of dehydrated granulated molecular sieve KNaE (erionite) in which the water content was about 0.8 wt. %. The adsorption column is provided with sensors for measuring the gas temperature at the inlet and outlet, with pressure sensors, and with filters to preclude the entrainment of dust-like zeolite particles.

Nitrogen trifluoride in an amount of 434 liters, having the composition: $N_2$, 8.5 vol. %; $CF_4$, 0.8 vol. %; $NF_3$, 90.6 vol. %; $CO_2$, 50 ppm; $N_2O$, 50 ppm; $N_2F_2$, 20 ppm is fed to an evacuated adsorption column at a rate such that the growth of pressure in the column does not exceed 0.05 atm per minute.

Adsorption of nitrogen trifluoride is carried out at a temperature of 20±1° C. for 24 hrs. During this period of time, as a chromatographic analysis has shown, no $NF_3$ and high-boiling impurities are detected in the relief gases, and the $CF_4$ concentration is 6.7 vol. %.

On completion of the sorption process, for displacing waste gases containing $CF_4$ from the column, nitrogen is passed through the column at 20° C. for 15 min. With the absence of $CF_4$ in the waste gases, confirmed by chromatographic analysis, desorption of nitrogen fluoride is started. For this purpose, nitrogen preheated to 60° C. is fed to the column, and desorption of nitrogen trifluoride is carried out with nitrogen recirculating through the adsorption column and a condenser cooled to −190° C. The desorption process lasts for about 3 hrs.

The purified nitrogen trifluoride obtained in the condenser, after the removal of nitrogen, contained: $NF_3$, 99.99 vol. %; $N_2$, 0.005 vol. %; $CF_4$, ≦10 ppm; $CO_2$, ≦10 ppm; $N_2O$, 10 ≦ppm. The weight of the end product was 1175 g. The yield of purified $NF_3$ was 94.3%.

The following Examples were carried out similarly to Example 1 and are presented in the table hereinbelow.

| | | Conditions and results of purifying nitrogen trifluoride from $CF_4$ impurity | | | | | | | |
|---|---|---|---|---|---|---|---|---|---|
| | | Passed | | | | | Obtained | | |
| | Amount of mixture, | Composition of mixture, vol. % | | $NF_3$ sorption temperature, ° C. | $H_2O$ content in erionite, wt. % | Composition of end product | | Amount of purified $NF_3$, g | Yield, % |
| Nos. | lit. | $NF_3$ | $CF_4$ | | | $NF_3$ vol. % | $CF_4$ ppm | | |
| 1 | 434 | 90.6 | 0.8 | 20 ± 1 | 0.8 | 99.99 | ≦10 | 1175 | 94.3 |
| 2 | 356 | 89.5 | 0.9 | 29 ± 1 | 0.5 | 99.99 | ≦10 | 930 | 92.1 |
| 3 | 470 | 91.0 | 0.7 | 10 ± 1 | 0.9 | 99.99 | ≦10 | 1295 | 95.5 |
| 4 | 417 | 92.0 | 0.6 | −25 ± 1 | 0.4 | 99.99 | ≦10 | 1156 | 95.1 |

*The balance: $N_2$, $CO_2$, $N_2O$, $N_2F_2$

What is claimed is:

1. A method of purifying gaseous nitrogen trifluoride containing $CF_4$ as impurity, comprising selective adsorption of said nitrogen trifluoride by dehydrated crystalline porous synthetic zeolite consisting essentially of erionite and having elliptical pores whose maximum and minimum diameter is 5.2 Å and 3.5 Å, displacement of carbon tetrafluoride with an inert gas, desorption and condensation of the purified nitrogen trifluoride.

2. A method according to claim 1, wherein said synthetic zeolite contains crystallization water in an amount not exceeding 1.0 wt. %.

3. A method according to claim 1, wherein said selective adsorption of said nitrogen trifluoride is carried out within a temperature range of −30 to 30° C.

4. A method according to claim 1, wherein said erionite has the formula $(Na, K)_9Al_9Si_{27}O_{72} \cdot 27H_2O$ and is used as said synthetic zeolite.

* * * * *